United States Patent

[11] 3,600,077

[72] Inventors Antonio S. Paiva
  Newark;
  Justin V. Paulauskas, Elizabeth, both of, N.J.
[21] Appl. No. 751,436
[22] Filed Aug. 9, 1968
[45] Patented Aug. 17, 1971
[73] Assignee Weston Instruments, Inc.
  Newark, N.J.

[54] ELECTRICAL INDICATING INSTRUMENTS
  6 Claims, 3 Drawing Figs.
[52] U.S. Cl. ................................................ 353/40, 353/14, 353/78
[51] Int. Cl. ................................................ G03b 21/10
[50] Field of Search .......................................... 353/40, 41, 14, 78, 47, 50, 51, 98, 99; 116/114.12

[56] References Cited
UNITED STATES PATENTS

| 2,831,253 | 4/1958 | Hodges | 33/147 (E) |
| 3,189,111 | 6/1965 | Ast | 353/41 X |
| 975,949 | 11/1910 | Henwood | 353/40 |
| 1,740,130 | 12/1929 | Von Voss et al. | 116/114.12 |
| 1,811,770 | 6/1931 | Wheeler | 353/50 X |
| 1,893,421 | 1/1933 | Latzko et al. | 353/40 |
| 2,191,045 | 2/1940 | Slayton | 353/14 |
| 2,570,621 | 10/1951 | Williams | 353/40 |

FOREIGN PATENTS

| 563,567 | 8/1944 | Great Britain | 353/40 |
| 635,170 | 4/1950 | Great Britain | 353/40 |

Primary Examiner—Harry N. Haroian
Attorneys—William R. Sherman, Stewart F. Moore and Jerry M. Presson ABSTRACT: An indicating instrument is described which displays the value of some driving or control signal on a viewing screen as a sharp, bright image which is devoid of noticeable light-dispersion effects, such as image shadowing or rainbowing. This result is accomplished by focusing a concentrated light beam onto the path of movement of the image-forming element which takes the more specific form of a movable transparent vane. The diverging vane image is focused onto the viewing screen by means of a concave mirror having its concave reflecting surface spaced from, and facing, the back surface of the viewing screen. The vane is caused to move in the prescribed path in response to the signal applied to the instrument. The concave mirror is preferably of spherical or aspheric shape and serves as an efficient collector and reflector of incident light rays. Also disclosed is a panel-mountable indicating instrument of overall rectangular shape and a flat and relatively thin edgewise appearance made possible by an optical system which provides vane images having the above-described characteristics.

PATENTED AUG 17 1971

3,600,077

INVENTORS
Justin V. Paulauskas
Antonio S. Paiva
BY

*Jm Presson*

ATTORNEY

ELECTRICAL INDICATING INSTRUMENTS

This invention relates to indicating instruments and more particularly, to measuring instruments which display the value of a measured signal as an image on an instrument viewing screen.

Prior art instruments of this general type conventionally employ a source of practically white light, such as an incandescent lamp, which illuminates a light-transmitting viewing screen. The screen may bear a scale graduated in terms of one or more parameters of the measured signal or the screen may be completely devoid of indicium and instead serve as a medium for displaying images of indicia projected onto the screen. In such instruments, use is made of a movable thin vane or mask, generally of rectangular cross-sectional shape, the vane being displaced in response to the signal to intercept that portion of the light received by the screen which represents the measured signal value or the complement thereof.

Transparent, colored vanes are oftentimes preferred to opaque vanes because the former type of vanes provide a recognizable color contrast between the vane image which is displayed on the viewing screen and background screen illumination provided, for example, by unfiltered or differently filtered light from the incandescent lamp. Transparent vanes are often used as the medium which bears opaque indicia such as numerals, letters, or other characters for projection onto the viewing screen. For some applications it may be desired to project the vane configuration or shape onto the screen, with or without indicia.

In instruments of this type it is manifestly requisite that the image which is projected onto the screen be as bright as possible and sharp, that is, devoid of all light-dispersion effects which typically cause edge shadowing and/or "rainbowing" of the displayed image.

A typical prior art approach to obtain, for example, a moving rectangular bar or band of colored light visible from the front screen surface is to shadow the illumination of the back screen surface with a rectangular, transparent vane of some suitable color. However, the problem with this approach is that the light source which provides the screen and vane illumination is typically obtained, for various obvious reasons, from an incandescent lamp formed with a filament having a relatively large light radiating surface area. The lamp is constrained to a position relatively near the vane by practical limitations placed on the maximum permissible size of the instrument casing. The light rays emanating from a nearby light source of some relatively large area (as contrasted to a virtual point source of light located at some position remote from the vane) are not parallel light rays and consequently produce noticeable diffraction and other light-dispersion effects adjacent the edge portion of a vane positioned in these nonparallel light rays. These light-dispersion effects appear as a noticeable shadowing or blurring of the projected image particularly adjacent the leading edge of the image.

In other types of prior art instruments of the specified type use is made of a transparent vane bearing opaque indicia, or vice versa. In such instruments the indicium corresponding to the value of the measured signal is typically projected onto a screen by an optical projection system comprised of one or more projecting lenses. However, like a prism, a projection lens also has an index of refraction and therefore may impart chromatic or spherical aberrations to the practically white light received from the incandescent lamp. The spreading out or dispersion of the light emerging from the projecting lens into essentially the basic six colors causes visually noticeable spectral lines or "rainbowing" of the projected image. Accordingly, such prior art instruments sometimes display images which lack brightness and coherency.

According to one embodiment of this invention, there is provided an indicating instrument suitable for mounting on an instrument panel which displays for viewing the value of a measured signal on an elongated viewing screen. The value is displayed as an image, which is extremely bright and sharply defined and devoid of disturbing light-dispersion effects. This result is accomplished by forming and projecting, by means of a converging lens system, a convergent light beam across a prescribed path of displacement of an image-forming element, referred to herein as a "vane," and onto the reflecting surface of a concave mirror having an elongated mirror surface of spherical or aspheric shape. The mirror is positioned so that the mirror surface thereof is spaced from and faces a lengthwise section of the back surface of the viewing screen which is to be illuminated thereby. The vane is caused to move in the prescribed path in response to the measured signal. The focal points of the converging lens system and the concave mirror are practically in the same plane as that prescribed for vane travel. The portion of the vane which intercepts the concentrated light beam is transmitted as a bright, sharply defined image onto the mirror surface. The mirror collects and reflects incident light rays with high optical efficiency and accordingly is able to focus a sharp, brilliant image of the vane portion onto the desired area of the viewing screen without accompanying light-dispersion effects.

The vane may be formed as a thin strip of film or similar device. The vane may be completely opaque, completely transparent, or partially opaque and partially transparent, one obvious example of the latter being a transparent vane bearing opaque indicia. As exemplary of one embodiment of this invention, the vane is disclosed as a rectangular, transparent filter having a color selected to provide an easily detectable color contrast to the background screen illumination. The projected image portion of the vane is thus displayed as a sharp and brightly contrasting rectangular light bar.

For better understanding of the present invention, together with other and further objects thereof, reference may be had to the following description taken in connection with the accompanying drawings, the scope of the invention being pointed out in the appended claims. Referring to the drawings:

Figure 2:
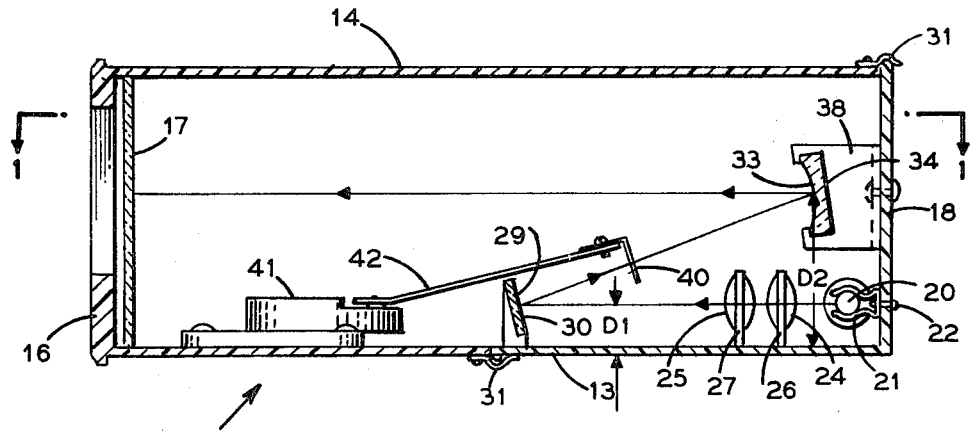
FIG. 2 is a cross-sectional view taken on line 2—2 of FIG. 1 with the top plate mounted on the instrument.
Figure 1:
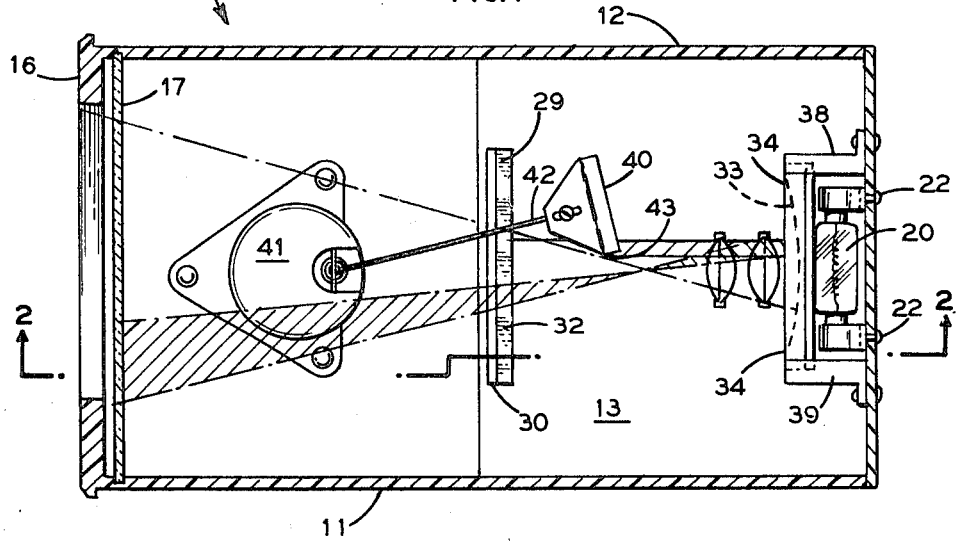
FIG. 1 is a plan view of one embodiment of the invention with a top covering plate removed for purposes of clarity.

Referring to FIGS. 1 and 2, numeral 10 designates an instrument constructed in accordance with the principles of this invention. The optical system for the instrument is mounted within a rectangular casing which is sealed against the entry of ambient light, dust and other extraneous matter which might deleteriously affect the operation of the optical system. The internal wall of the casing may be coated with a suitable light-absorbing material to absorb extraneous light rays in the casing.

Figure 3:
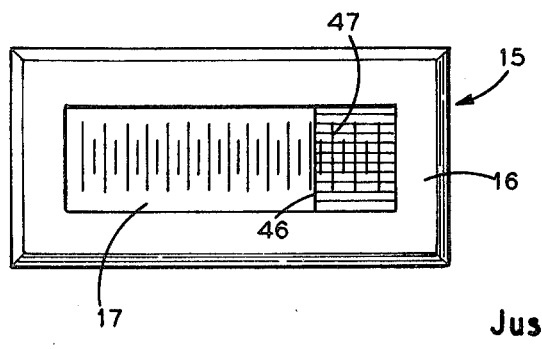
FIG. 3 is a front end view of FIG. 1 illustrating the type of light bar which is obtainable with the instrument of this invention.

The instrument casing is formed of two flat, parallel sideplates 11 and 12, a flat bottom plate 13 and a flat top plate, 14, FIG. 2, the latter plate being removed in FIG. 1 in order to reveal the instrument optical system. The casing also includes a conventional front bezel assembly 15 FIG. 3 comprising a bezel 16 and a planar translucent image viewing screen 17 of overall rectangular shape. The instrument is illustrated as being symmetrical with respect to a longitudinal plane taken perpendicular to the longitudinal axis of the screen and passing through the center thereof. As best seen in FIG. 3, the exposed portion of the screen 17 may include scale indicia appropriately graduated in values of a measured signal. The screen 17 may take other forms as well. For instance, the screen may be divided lengthwise into two halves, one half being opaque and having the scale indicia inscribed thereon and the other half being translucent and displaying the projected vane image adjacent the scale indicia inscribed on the opaque half. Although the screen is illustrated as being a planar it may also be arcuate and curve outwardly. The bezel 16, FIG. 2, is fixed to the front ends of the sideplates 11 and 12 by any suitable means. Opposite edges of the screen 17 are conveniently secured within opposed grooves formed in the interior walls of the plates 11 and 12.

The translucent screen 17 constitutes a light-transmitting surface that transmits to the front surface of the screen for external viewing vane images projected onto the back surface of the screen. Located opposite the screen 17 is a rear casing wall 18 which mounts an incandescent lamp 20 on a pair of metallic clamps 21 which serve to releasably clamp the lamp terminals and additionally, provide part of an external electrical connection through terminals 22 between the ends opposite of the lamp filament and an undisclosed battery source used to illuminate the lamp.

The filament of the lamp 20 is elongated, the midpoint of the filament coincides with the principal axis of a conventional condensing lens system and the longitudinal filament axis is perpendicular to that principal axis. The condensing lens system concentrates diverse incident light rays received from the lamp filament into a well-defined beam of visible light which converges onto that portion of the vane surface which is displaced to intercept the beam. The lens system comprises two condensing lenses 24 and 25 mounted on base supports 26 and 27, respectively, with the principal axes of the lenses coaligned.

In the illustrated embodiment of the instant invention, the concentrated light beam emerging from the condensing lens system is disclosed as being initially directed toward the screen and then reflected back and directed toward the rear wall 18 of the instrument casing from whence the beam is projected for display. The light beam is directed through this particular optical path for several practical reasons which will now be discussed.

Requirements typically imposed upon instruments of this type are firstly, that the instrument casing have a width, that is, an edgewise dimension, which is limited primarily by the width accorded the rectangular viewing screen; secondly, that the instrument casing house conventional electrical meter movements to drive the vane which may not and typically are not, specifically designed for incorporation in a relatively thin panel instrument and hence may occupy a substantial volume and thirdly, that the system, and especially the light source therefor, be accessible for cleaning or replacement.

The first requirement is particularly important in those applications where the instrument is to be mounted on an instrument panel in close side-by-side relationship with other indicating instruments of the same type. This requirement often arises when it is desired to monitor a number of different driving or control signals by visually scanning a bank of rectangular light bars in side-by-side alignment. To provide a width of instrument casing equal to, or less than, the width of the viewing screen, the corresponding dimensions of the optical system utilized by the instrument are similarly limited. Considering now the second requirement, it is often preferred that conventional meter mechanisms be used to drive the vane. These mechanisms are frequently of substantial size and being opaque, consideration must be given to allocating an area for the mechanism which does not obstruct the optical system. With regard to the third requirement, it is generally preferred that the incandescent lamp, and possibly in addition, the entire optical lens system be accessible for removal. Since the front portion of the instrument casing is designed to receive the viewing screen, and with the instrument mounted in a panel, it is often preferred that at least the incandescent lamp be mounted adjacent the rear of the instrument to obtain access thereto from the back of the mounting panel.

The fulfilling of these and other requirements is of course important from a practical viewpoint and is accomplished by the illustrated optical system. However, it will be understood that it may not be essential for some applications that the convergent light beam be reflected back and then focused onto the viewing screen. For these applications, the convergent light beam emerging from the condensing lens system might be focused onto the vane without any intervening reflection.

Considering again the illustrated embodiment of this invention, the lenses 24 and 25, FIG. 1, are positioned to direct the converging beam of light forwardly or toward screen 17, the beam being directed across and above the internal surface of the plate 13 and onto a planar reflecting surface 29 of a mirror 30. So that the precise image of the lamp filament does not appear as such on the screen the lenses 24 and 25 are mounted so as to be slightly out-of-focus with respect to that filament. The perpendicular distance between the principal optical axis of the lens system and the internal surface of this plate 13 is designated D1. Ambient conditions permitting, the lenses could be mounted in an aperture formed in the wall 18 and the lamp 20 suitably mounted rearwardly of the lenses and externally of the instrument casing. If desired, the entire optical system may be detached from the front portion of the instrument by having the rear wall 18 and a contiguous rear section of the bottom plate 13 mounting the mirror 30 formed of a single piece of metal. Spring clips 31 fixed to the plate 14 and the adjoining edge of the plate 13 are exemplary one type of fastening means which can be employed to secure the mounting of the optical system to the front portion of the instrument.

The mirror 30 has an overall rectangular shape and is mounted stationary on the base 13 by a base support member 31 with the geometrical center of the mirror substantially concentric with the principal axes of the lenses 24 and 25 and the longitudinal axis of the mirror parallel to the longitudinal axis of the lamp filament. The light reflecting surface 29 of the mirror 30 faces the rear wall 18 and the plane of this surface is inclined with respect to the principal axis of the lens system at an angle equal to the desired angle of reflection. The angle of reflection is selected so that the concentrated light beam incident to the surface 29 is reflected or folded back onto a mirror surface 33 of a rearwardly mounted mirror 34. The angle of reflection is typically on the order of 45°. The area of the mirror surface 29 is large enough for the mirror to receive as incident light all of the converging light rays forming the concentrated light beam. However, the width dimension of the mirror 30, should be small enough so that the upper edge of the mirror 30, FIG. 2, does not obstruct or reflect rearwardly the light which is focused by the mirror 34 onto the desired portion of the screen 17.

The center of the surface 33 is mounted a second perpendicular distance D2 from the surface of the plate 13, the distance D2 being sufficiently greater than the distance D1, so that for some maximum permissible longitudinal spacing between the surfaces 17 and 33, prescribed by the maximum permissible instrument casing length, the mirror 34 will focus all incident light onto the desired portion of the back screen surface without the light being obstructed by intervening structures; specifically the upper edge of the mirror 30 and the hereinafter described vane 40 and associated driving means 41.

The light beam projected onto the surface 33 is a diverging light beam having its focal point in the plane of movement of the vane 40. With the focal point of the converging lens system in the plane of vane travel, light diffraction effects, particularly light diffraction at the leading edge of the vane which intercepts the focused light beam are minimal, and as a practical matter, are not visually detectable on the viewing screen. The vane 40 may be driven by any suitable mechanism and is illustrated as being driven in an arcuate path by a conventional permanent magnet-moving coil, or D'Arsonval, type of electrical instrument movement mounted stationary on the base plate 13. The movement 41 is accommodated between the screen 17 and the mirror 30 so as not to obstruct the instrument optical system. The vane 40 is connected to the moving coil of the instrument 41 by a connecting arm 42. The radius of the arc circumscribed by vane travel may be maximized by positioning the movement 41 relatively close to the screen 17 and by having the length of the arm 42 relatively long. Interference with the light which is projected onto the screen by the mirror 33 is avoided by mounting the portion of the arm 42 connected to the movement 41 closely adjacent the bottom plate 13, the remaining portion of the arm nearer the vane being bent upwardly to avoid contact with the free, lengthwise edge of mirror 30. The lower edge of the vane is mounted high enough to avoid interference with the light rays traveling from the lens 25 to the mirror 30. Best accuracy is obtained by having the pivot axis of the vane and the principal axis of the optical system in the plane of symmetry of the instrument. The movement 41 is typically designed such that a driving or control signal applied to the movement 41 causes an angular displacement of the vane 40 which is proportional to the magnitude of that signal.

In order to display the magnitude of the instrument 41 driving signal as a planar rectangular light bar the vane 40 is also made planar with a similar and suitably proportioned rectangular configuration. To provide a color contrast between the displayed rectangular light bar and contiguous illumination, the vane 40 is comprised of a transparent color filter which transmits an appropriate wavelength or wavelengths of the incident convergent white light. To minimize variations in light intensity across the surface and along the leading edge 43 of the vane, the vane is mounted on the free end of the arm 42 perpendicular to the longitudinal or focal axis of the convergent beam reflected from the mirror 30.

Manifestly, the vane may have configurations other than rectangular, such as triangular, depending upon the configuration which is to be accorded the illuminated display and as mentioned briefly above may be transparent or colored and/or bear indicium. Moreover, and particularly in those instances where it is desired to project indicia inscribed on the vane onto the screen, the vane may be arcuate and concave with respect to its axis of rotation. The leading vane edge 43 and that adjoining portion of the vane which intercepts the concentrated beam of light is projected onto the screen by the concave mirror 34 as a brilliant and sharply defined image. Considering now the details of the mirror 34, with the distance between the back screen surface and the surface 32 fixed by the allowable longitudinal dimension of the instrument casing and with the distance between the mirror 34 and the vane 40 established at a distance such that the vane will not intercept its own projected image, a radius of curvature for the mirror 34 is selected which will cause the mirror to focus the vane image on the back screen surface. Inasmuch as the divergent light rays incident to the spherical reflecting surface 33 are not normal to this surface, the mirror 34 is tilted forwardly to form an angle of reflection with incident diverging light rays which provides maximum intensity of illumination to the desired portion of the viewing screen. Accordingly, the mirror 34 is mounted stationary to the wall 18 by brackets 38 and 39, with the upper edge of the surface 33 inclined closer to the screen 17 than the bottom edge by an amount which will provide the desired angle of reflection to the light rays that are reflected forwardly from this surface. To obtain a theoretically infinite magnification of the vane image, the plane of vane travel may be made coincident with the focal point of the mirror 34. Normally, however, this plane is located slightly forwardly of the focal point, FIG. 1. The vane end overlying the free end of arm 42 may be slotted to permit a limited manual vane adjustment in directions parallel to the longitudinal axis of the arm until optimum image sharpness is achieved.

It is important that a concave mirror surface 33 of spherical or of an aspheric shape, for example parabolic, be used to project the vane image onto the screen because these mirrors are highly efficient light collectors and provide an extremely high level of image brightness on the screen. Moreover, such mirrors do not have the disadvantages of conventional projection lenses. The mirror 34 is of generally rectangular shape to conform with the elongated light radiation surface of the lamp 20 filament, has a longitudinal axis parallel to the longitudinal axis of the lamp 20 and the screen 17 and the length and width dimensions of its reflecting surface 33 essentially proportional to the respective length and width dimensions of the screen portion which is to be illuminated thereby. The midpoint of the surface 33 is in optical alignment with the midpoint of the lamp filament and is in the plane of instrument symmetry.

For reasons related hereinabove, the leading edge 46 of the rectangular light bar 47, FIGS. 1 and 3, is a bright and sharply defined, magnified image of the vane edge 43. The remainder of the bar 47 is similarly a bright and sharply defined, magnified image of the adjoining portion of the vane which intercepts the concentrated light beam derived from the condensing lens. The edge 46 forms a sharp, shadow-free interface between it and the projected but unfiltered light rays which are also focused onto the screen by the mirror 34. If the vane is formed of a transparent film strip colored to provide an easily recognizable color contrast to the background screen illumination, a sharply defined and brightly contrasting colored light image will appear on the screen which is devoid of noticeable light-dispersion effects, such as rainbowing. A visual indication is thereby provided on the screen of the position of the vane in the concentrated light beam, the edge 46 moving for example, from right to left as viewed in FIGS. 1 and 3 with increasing values of signal applied to the movement 41 and moving from right to left with decreasing signal values. Obviously, movement 41 could be of a type which would drive the vane edge 43 from a point slightly to the right, as viewed in FIG. 1, of the concentrated beam reflected off the mirror 30 with one value of measured signal, and leftward from that point with further increases in signal values. In the latter case, the projected leading edge 46 would move correspondingly from left to right as viewed in FIG. 3 with increasing signal values from some initial position which may be to the left of the viewing screen and perhaps behind the bezel 16 and thusly obscured from view. Other modifications will of course be apparent to those skilled in the art. For example, if it is desired to shape the convergent light beam emerging from the condensing lens system an opaque mask having an aperture of the desired shape could be interposed between the vane 40 and the lens 25.

What I claim Is:

1. An indicating instrument comprising, a planar base having a front and a rear end, a rectangular light-transmitting screen portion mounted at the front end of said base with the light transmitting screen surface thereof perpendicular to the plane of said base, a source of visible light and a lens system mounted adjacent the rear end of said base for condensing light received from said source into a convergent light beam, said light beam being directed by said lens system across said base toward said screen, an elongated, concave mirror mounted adjacent said rear end and having a light reflecting surface positioned to focus incident light onto a portion of said screen, said concave mirror being displaced from said lens system in a direction perpendicular to the plane of said base, a planar mirror interposed between said screen and said lens system and including a planar reflecting surface for reflecting the convergent light beam from said lens system, a transparent light filter movable across the reflecting surface of said planar mirror in a path, means for mounting said planar mirror at an angle with respect to the principal axis of said lens system such that the convergent light beam is reflected rearwardly to intercept a portion of the path of said filter, means responsive to a control signal for displacing said filter in said path, the extent of filter illumination through interception of the reflected light beam being determined by the value of the control signal received by the displacing means, said filter being comprised of a light-transmitting material selected to provide a visually detectable color contrast on said screen between the portion of said filter which is illuminated and the nonintercepted portion of the light beam, both portions of the light beam being reflected back onto said screen by said concave mirror.

2. The instrument as claimed in claim 1, wherein said displaying means is mounted on said base between said planar mirror and said screen.

3. The instrument as claimed in claim 2, which further comprises, an elongated arm extending over one edge of said planar mirror for coupling said filter to said displacing means.

4. The instrument as claimed in claim 1, wherein said light filter comprises a planar, transparent vane of rectangular shape.

5. The instrument as claimed in claim 1, wherein said displacing means is an electrical measuring instrument movement mounted on said base between said screen and said planar mirror and having a portion thereof which rotates through an angle corresponding to the magnitude of the control signal applied thereto, and an elongated arm extending over and adjacent one edge of said planar mirror for coupling said portion of said instrument movement to said filter to cause corresponding arcuate displacement of said filter.

6. The instrument as claimed in claim 5, wherein said filter is comprised of a planar, transparent element of rectangular shape.